United States Patent [19]
Takahashi

[11] Patent Number: 5,399,446
[45] Date of Patent: Mar. 21, 1995

[54] BATTERY CARTRIDGE HAVING A TERMINAL FOR TRANSFERRING INFORMATION THEREFROM

[75] Inventor: Mikio Takahashi, Tokyo, Japan

[73] Assignee: Sony Corporation, Japan

[21] Appl. No.: 280,243

[22] Filed: Jul. 25, 1994

Related U.S. Application Data

[63] Continuation of Ser. No. 67,949, May 27, 1993, abandoned.

[30] Foreign Application Priority Data

Jun. 30, 1992 [JP] Japan .................... 4-173392

[51] Int. Cl.⁶ .................................... H01M 10/48
[52] U.S. Cl. ............................. 429/90; 429/97
[58] Field of Search .............. 429/7, 62, 90, 96, 97, 429/98, 100

[56] References Cited

U.S. PATENT DOCUMENTS

| | | | |
|---|---|---|---|
| 2,225,460 | 12/1940 | Porth . | |
| 2,266,686 | 12/1941 | Emanuel . | |
| 3,667,026 | 5/1972 | Bogut et al. | 320/36 |
| 3,917,990 | 11/1975 | Sherman, Jr. | 320/35 |
| 4,006,396 | 2/1977 | Bogut | 320/2 |
| 4,123,598 | 10/1978 | Hammel | 429/159 |
| 4,315,364 | 2/1982 | Leffingwell | 29/623.1 |
| 4,329,406 | 5/1982 | Dahl et al. | 429/92 |
| 4,468,605 | 8/1984 | Fitzgerald et al. | 320/36 |
| 4,530,034 | 7/1985 | Kawarada | 362/9 |
| 4,576,880 | 3/1986 | Verdier et al. | 429/99 |
| 4,637,965 | 1/1987 | Davis | 429/1 |
| 4,737,420 | 4/1988 | Ikeda et al. | 429/1 |
| 4,943,498 | 7/1990 | Cooper et al. | 429/97 |
| 4,969,206 | 11/1990 | Desrochers | 455/89 |
| 4,997,731 | 3/1991 | Machid et al. | 429/90 |
| 5,057,383 | 10/1991 | Sokira | 429/98 X |
| 5,111,128 | 5/1992 | Branan, Jr. et al. | 320/2 |
| 5,183,714 | 2/1993 | Mitsui et al. | 429/123 |
| 5,200,686 | 4/1993 | Lee | 429/7 X |
| 5,208,116 | 5/1993 | Joh | 429/96 |
| 5,227,262 | 7/1993 | Ozer | 429/90 X |
| 5,248,927 | 9/1993 | Takei et al. | 320/2 |

FOREIGN PATENT DOCUMENTS

| | | |
|---|---|---|
| 0480706 | 4/1992 | European Pat. Off. . |
| 0549950 | 7/1993 | European Pat. Off. . |
| 0572327 | 12/1993 | European Pat. Off. . |
| 3637669 | 5/1988 | Germany . |
| 9112374 | 2/1992 | Germany . |
| 59-167098 | 9/1984 | Japan . |
| 1487604 | 10/1977 | United Kingdom . |
| 9211679 | 7/1992 | WIPO ................. 429/7 |

OTHER PUBLICATIONS

Sony Rechargeable Battery Pack, NP-55/55H/66/66H/77/77H Instruction Sheet, (Date unknown).
European Search Report, Sep. 9, 1993.
European Search Report, Dec. 20, 1993.

*Primary Examiner*—Stephen Kalafut
*Attorney, Agent, or Firm*—Ronald P. Kananen

[57] ABSTRACT

A battery pack includes on the bottom surface of its casing an information output terminal. An internal circuit board has an overcharge preventing circuit, an overdischarge preventing circuit and an overvoltage preventing circuit are provided. Integrated circuitry for generating an identification (ID) signal and for processing is assembled on a part of the circuit board or its clearance and the ID signal is mixed with inside information. Analog and digital signals or a mixed signal thereof are output from the information output terminal.

13 Claims, 2 Drawing Sheets

BATTERY CARTRIDGE HAVING A TERMINAL FOR TRANSFERRING INFORMATION THEREFROM

This application is a continuation of application Ser. No. 08/067,949, filed May 27, 1993, now abandoned.

BACKGROUND OF THE INVENTION

1. Field of the Invention

The present invention relates to battery packs and, more particularly, is directed to a rechargeable type battery pack for use in a power supply of a video tape recorder having a built-in camera, for example.

2. Description of the Relevant Art

Conventional battery packs that are utilized as a power supply of electrical machinery and apparatus such as a video tape recorder having a built-in camera, a portable video tape recorder or the like include, fundamentally, plus and minus terminals used to charge and discharge a battery and a so-called T terminal used to output the temperature detected in the inside of the battery pack.

Generally, battery packs made by different makers are different in specification, shape, terminal structure, detection hole or the like. Therefore, battery packs made by different makers are not compatible with each other and a battery pack made by a certain maker cannot be attached to the apparatus made by different makers.

According to the conventional battery packs, an information signal such as data representative of capacity displayed on a battery charger when a battery is charged, capacity displayed on the electrical machinery and apparatus when the battery is discharged, type of battery cells used when the battery charger is switched, the number of battery cells used when the charge and discharge capacity is switched and when intensity of video light is switched or the like cannot be output. Hence, the conventional battery pack is requested to have an output terminal to output such information signal.

As a so-called 8-mm video tape recorder that is one of video tape recorders having a built-in camera becomes more popular on the recent market, it becomes clear that fraudulent battery packs having a compatibility with battery packs that are manufactured by a particular maker are manufactured and become commercially available on the market of the whole world. Such fraudulent battery packs spoil the legitimate market.

A conventional battery pack has no output terminal to output an electrical signal that can identify a battery pack manufacturer. Therefore, in order to discriminate fraudulent battery packs from battery packs of entirely real-manufacturer maker and to remove the same from the market, makers have no choice but to print logo-types of company names, marks that indicate battery packs of entirely real-manufacturer make or the like on the surfaces of the battery packs.

Insofar as battery packs are manufactured in the same size and shape, it is unavoidable that battery packs are made compatible. For this reason, it has been requested that fraudulent battery packs are discriminated from battery packs made by a certain maker and removed from the market by some mechanical arrangements.

OBJECTS AND SUMMARY OF THE INVENTION

Therefore, it is an object of the present invention to provide an improved battery pack in which the aforesaid shortcomings and disadvantages of the conventional battery pack can be eliminated.

More specifically, it is an object of the present invention to provide a battery pack which can output information signals that are required when a variety of informations are displayed on the electrical machinery and apparatus side.

It is another object of the present invention to provide a battery pack in which fraudulent battery packs that are illegally manufactured and battery packs that are manufactured by a particular manufacturer can be discriminated from each other.

According to an aspect of the present invention, there is provided a battery pack which comprises positive plus (+) and minus negative (−) terminals used to charge and discharge a battery, a temperature (T) terminal used to detect a temperature of the battery pack, and an information output terminal at which an information signal including at least an identification (ID) signal is developed.

According to the battery pack of the present invention, since the information signal including at least the ID signal is output from the information output terminal, a variety of information can be displayed on the electrical machinery and apparatus side such as a video camera utilizing a battery charger or battery pack, etc.

Since the electrical machinery and apparatus is operated under the control of the output ID signal or the like, the battery packs produced by other manufacturers cannot be made compatible with or substituted for the battery packs that are manufactured by an entirely real, legitimate manufacturer. There is then the advantage that the battery packs of an entirely real-manufacturer make and fraudulent battery packs can be discriminated from each other.

BRIEF DESCRIPTION OF THE DRAWINGS

A better understanding of other objects, features, and advantages of the present invention can be gained from a consideration of the following detailed description of an illustrative embodiment thereof, in conjunction with the figures of the accompanying drawings, in which.

DETAILED DESCRIPTION OF THE PREFERRED EMBODIMENT

A battery pack according to an embodiment of the present invention will hereinafter be described with reference to the drawings.

Figure 1:
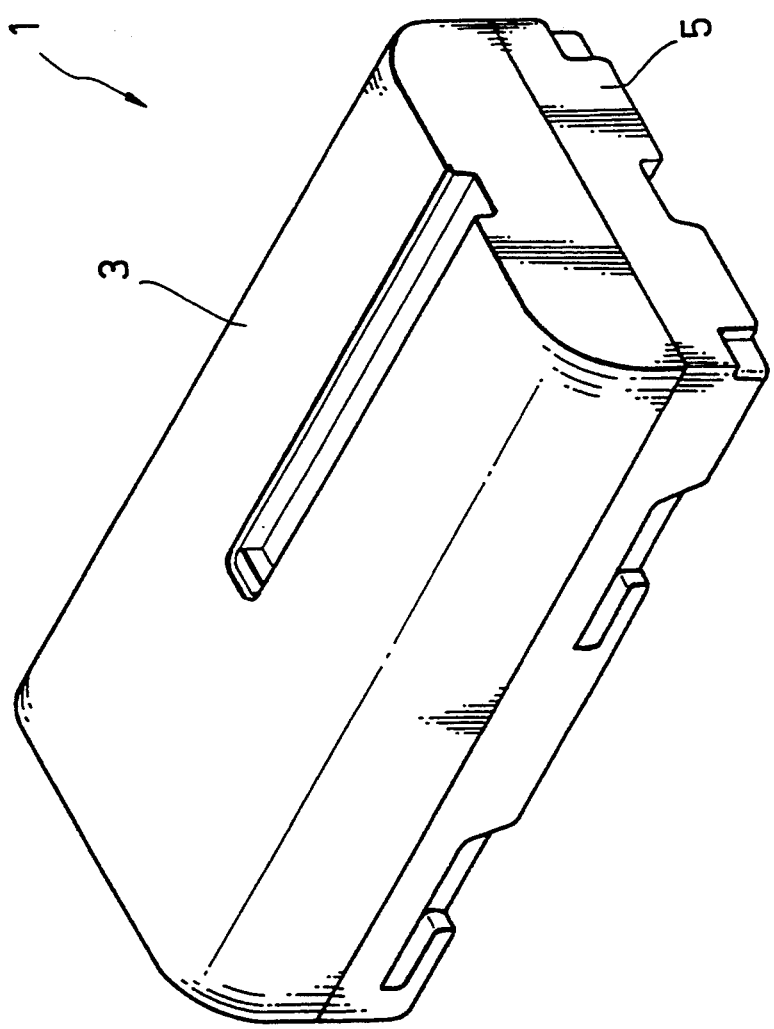
FIG. 1 is a perspective view showing a battery pack according to an embodiment of the present invention.

FIG. 1 of the accompanying drawings shows a battery pack 1 to which the present invention is applied. As shown in FIG. 1, the battery pack 1 comprises an upper casing 3 and a lower casing 5. The upper casing 3 and the lower casing 5 accommodate therein two serially-connected battery cells (not shown) of cylindrical configuration disposed in two rows. That is, four battery cells are accommodated in total.

The battery pack 1 includes positive plus (+) and minus negative (−) terminals used to charge and discharge battery cells, a temperature (T) terminal used to output the temperature of the inside of the battery pack, etc. These fundamental structures are well known and need not be described in detail.

Figure 2:
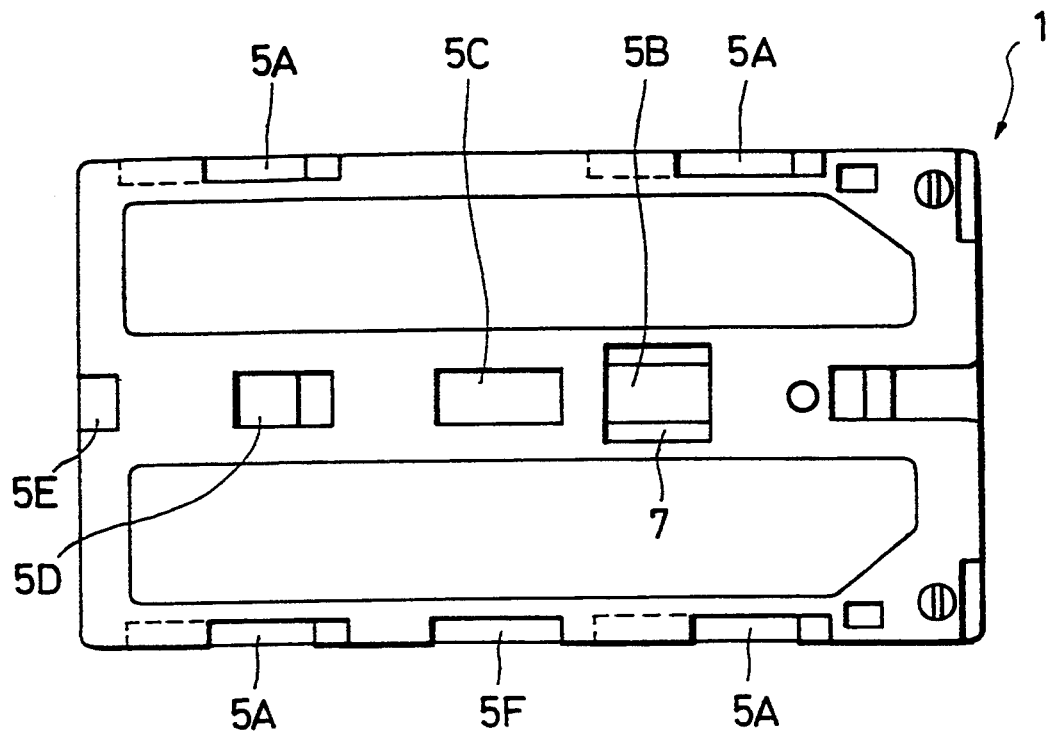
FIG. 2 is a bottom view used to explain a structure of the battery pack according to the embodiment of the present invention.
Figure 3:
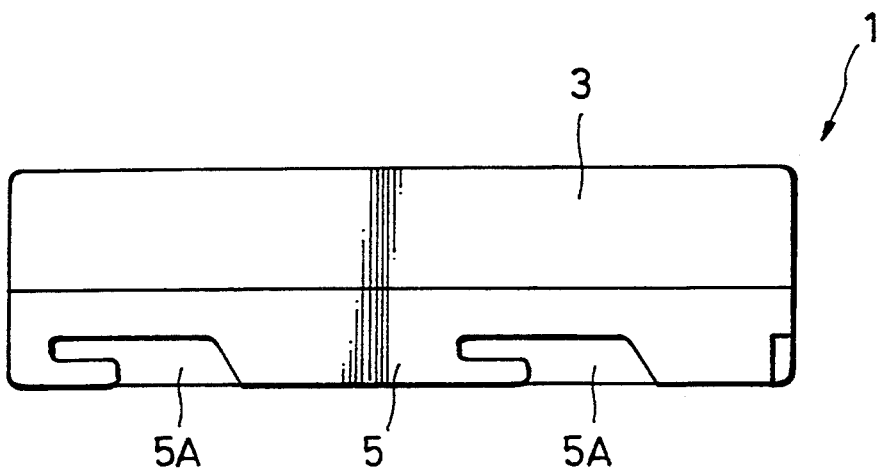
FIG. 3 is a side view of the battery pack according to the present invention.

As shown in FIGS. 2 and 3 of the accompanying drawings, the lower casing 5 has on its bottom surface four holes 5A, each of which has a rib formed around its outer peripheral side surface. When the battery pack 1 is attached to a battery accommodation portion of electrical machinery and apparatus such as a video tape recorder having a built-in camera or the like, protruded portions formed on the battery accommodation portion are engaged with these holes 5A, thereby to fix the battery pack 1 to the battery accommodation portion when the battery pack 1 is attached to the battery accommodation portion.

The lower casing 5 has on its bottom surface formed concave portions 5B, 5C and 5D serving as detection holes along a center line of the longitudinal direction. The lower casing 5 has on its bottom surface concave portions 5E, 5F serving as locking holes formed on at one side edge of the vertical direction and along the center line of the longitudinal direction. It is detected by the detection holes 5B, 5C, 5D whether or not the battery pack 1 can be properly attached to the charger. On the other hand, the locking holes 5E and 5F, fix the battery pack 1 to the charger at its predetermined position.

When the battery pack 1 is slid, the battery pack 1 is fixed to the battery charger at its predetermined position by the locking holes 5E, 5F. There is then the advantage that the battery pack 1 can be attached to and fixed to the battery charger with ease.

The concave portion 5B includes an information output terminal 7. The information output terminal 7 is coupled to an ID (identification) signal generator (not shown) such as a semiconductor memory or the like incorporated within the battery pack 1. The ID signal generated from the ID signal generator or the like are output from the information output terminal 7.

The battery pack 1 may incorporate therein a circuit board into which there are assembled an overcharge preventing circuit, an overdischarge preventing circuit and an overvoltage preventing circuit. The circuit board may assemble onto its part or spacing an IC (integrated circuit) for generating a predetermined ID signal and ICs for processing (generating and outputting) a variety of inside information that will be described later on. Preferably, the information signal may be output from the information output terminal 7 in the form of analog or digital signal that results from mixing the inside information to the ID signal or in the mixed signal form in association with the modes that the information signal is processed on the electrical machinery and apparatus side.

Inside informations output from the information output terminal 7 are a charging capacity displayed on the battery charger, a discharging capacity displayed on the electrical machinery and apparatus, battery cell type for changing the battery charger, battery cell number for switching the display of charge and discharge capacity and/or intensity of video light, etc.

An output signal from the information output terminal 7 is transmitted when the information output terminal 7 formed as a metal plate contacts with a metal pin provided on the battery charger and the electrical machinery and apparatus. Alternatively, the output signal is transmitted in a non-contact fashion such as the occurrence of magnetic change, electrostatic capacitance change, optical change at the information output terminal 7 or the like.

Since the ID signal and the inside information are output from the information output terminal 7 as described above, a variety of information can be displayed on the electrical machinery and apparatus side.

Further, since the electrical machinery and apparatus is operated under the control of those output signals, battery packs that cannot output the ID signal and the inside information, i.e., fraudulent battery packs can be discriminated from battery packs of entirely real-manufacturer make and both of them cannot be made compatible with each other. Consequently, fraudulent battery packs can be removed from the market.

According to the battery pack of the present invention, since the information signal including at least the ID signal is output from the information output terminal, a variety of information can be displayed on the electrical machinery and apparatus side such as a video camera utilizing a battery charger or battery pack, etc.

Since the electrical machinery and apparatus is operated under the control of the output ID signal or the like, the battery packs of entirely real-manufacturer make cannot be made compatible with or replace the battery packs that are manufactured by other makers. There is then the advantage that the battery packs of entirely real-manufacturer make and the fraudulent battery packs can be discriminated from each other and such fraudulent battery packs can be removed from the market.

In addition, since the battery pack can be fixed to the predetermined position of the electrical machinery and apparatus such as the battery charger or the like when it is slid, the battery pack can be attached to and fixed to the electrical machinery and apparatus with ease.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A battery pack comprising:
   at least one battery disposed inside said battery pack;
   positive and negative terminals connected to said at least one battery for charging or discharging said at least one battery;
   a temperature terminal outputting a signal indicating the temperature of said battery pack;
   an information output terminal; and
   battery pack identification means connected to said information output terminal for generating an identification signal distinguishing said battery pack and for providing said identification signal to said information output terminal.

2. The battery pack according to claim 1, further comprising a casing; and engaging means on said casing for securing said battery pack.

3. The battery pack according to claim 1, further comprising detection hole means for detecting whether or not said battery pack is properly attached to a battery charger.

4. The battery pack according to claim 1, further comprising signal generating means connected to said information output terminal for providing at least one signal representative of information about the battery pack including at least one of the following: charging capacity, discharging capacity, battery type, and the number of batteries.

5. The battery pack according to claim 1, wherein said information output terminal comprises a metal plate for electrically transmitting signals from said information output terminal.

6. The battery pack according to claim 2, wherein, said engaging means further comprises holes, each of said holes having a rib, whereby said casing may be slid to attach and secure said battery pack to a compatible battery pack accommodation means.

7. The battery pack according to claim 2, wherein, said engaging means further comprises locking holes formed on the sides of said casing to hold said battery pack in a predetermined position with respect to a compatible battery pack accommodation means.

8. The battery pack according to claim 3, wherein, said detection hole means comprises concave holes disposed along a longitudinal axis of said battery pack; and one of said concave holes includes said information output terminal.

9. The battery pack according to claim 5, wherein, said metal plate is adapted to contact a metal pin of an external battery pack accommodation means.

10. The battery pack according to claim 1, further comprising a signal transmission means connected to said information output terminal for transmitting signals from said information output terminal.

11. The battery pack according to claim 10, wherein, said signal transmission means transmits said signals from said information output terminal as either a magnetic field change, an electrostatic capacitance change, or an optical change.

12. The battery pack according to claim 1, wherein said battery pack identification means is formed as an integrated circuit disposed inside said, battery pack.

13. The battery pack according to claim 4, wherein said battery pack identification means and said signal generating means are formed as integrated circuits disposed inside said battery pack.

* * * * *